United States Patent [19]

Loziuk

[11] Patent Number: 5,791,636
[45] Date of Patent: Aug. 11, 1998

[54] COMPACT PROFILE WIRE CABLE ISOLATOR AND ENERGY ABSORBING RESTRAINT

[76] Inventor: Larry Loziuk, 145 Midway La., Vernon Hills, Ill. 60061

[21] Appl. No.: 613,031

[22] Filed: Mar. 8, 1996

Related U.S. Application Data

[63] Continuation-in-part of Ser. No. 475,519, Jun. 7, 1995, Pat. No. 5,522,585, which is a continuation-in-part of Ser. No. 274,645, Jul. 13, 1994, Pat. No. 5,441,243, which is a continuation-in-part of Ser. No. 978,018, Nov. 18, 1992, Pat. No. 5,360,210, which is a continuation-in-part of Ser. No. 915,477, Jul. 16, 1992, Pat. No. 5,240,232.

[51] Int. Cl.$^6$ ............................................. F16F 3/00
[52] U.S. Cl. ............................................. 267/136; 267/148
[58] Field of Search .................................. 267/148, 136, 267/147, 149; 248/570, 526, 528, 901, 630, 638, 603; 188/378

[56] References Cited

U.S. PATENT DOCUMENTS

| | | | |
|---|---|---|---|
| 2,421,822 | 6/1947 | Wood | 248/54 |
| 3,025,031 | 3/1962 | Kerley, Jr. | 248/358 |
| 3,044,759 | 7/1962 | Kerley, Jr. | 267/1 |
| 3,074,681 | 1/1963 | Kerley, Jr. | 248/358 |
| 3,204,911 | 9/1965 | Lawrence et al. | 248/358 |
| 3,204,913 | 9/1965 | Lawrence et al. | 248/358 |
| 3,239,207 | 3/1966 | Camossi | 267/1 |
| 3,360,225 | 12/1967 | Camossi | 248/358 |
| 3,371,895 | 3/1968 | Speranza, Jr. | 248/20 |
| 3,596,865 | 8/1971 | Camossi | 248/358 |
| 4,190,227 | 2/1980 | Belfield et al. | 248/636 |
| 4,397,069 | 8/1983 | Camossi | 29/173 |
| 4,620,688 | 11/1986 | Khlafallah et al. | 248/542 |
| 4,783,038 | 11/1988 | Gilbert et al. | 248/570 |

(List continued on next page.)

FOREIGN PATENT DOCUMENTS

| | | | |
|---|---|---|---|
| 1450959 | 3/1969 | Germany | 267/148 |
| 3302852 | 9/1984 | Germany | |
| 1384852 | 3/1988 | U.S.S.R. | |
| 1634860 | 3/1991 | U.S.S.R. | |

OTHER PUBLICATIONS

Drawing from U.S. Patent Application Serial No. 07/068,580 or 088,580 (Photocopy not legible) entitled Seismic Stop Pipe Support by Robert L. Cloud & Associates, Inc.

Article "Reducing the Structural Response of a Floor Slab Subject to Flow Induced Pipe Vibration Using Wire Rope Isolators" by L. A. Loziuk, W.C. Maki, and H. LeKuch, presented at the 63rd Shock and Vibration Symposium, 10/26–30/92.

Article Reducing Pipe Vibration Using Wire Energy Absorbing Rope (Wear[198]) restraints, by L. A. Loziuk and Rob Zandbergen, presented at the 1992 ASME Pressure Vessel and Pipe Conference, Jun. 21–25, 1992.

Article Controlling Pipe Vibration Using Wire Energy Absorbing Rope Pipe Restraints:, by L. A. Loziuk, E. G. Berak and L. H. Ma, presented at the 1991 ASME Pressure Vessel and Pipe Conference, 6/23–27/91.

(List continued on next page.)

Primary Examiner—Mark T. Le
Attorney, Agent, or Firm—Welsh & Katz, Ltd.

[57] ABSTRACT

A compact profile, nested wire cable isolator includes first and second wire cable spirals, each spiral defining an internal or central region. Each of the spirals has a pair of entrapment members associated therewith. One of each of the first and second pairs of entrapment members is an internal entrapment member, disposed within the internal region of the other spiral. The internal entrapment members are connected one to the other. The other of the first and second pairs of entrapment members are external entrapment members. An energy absorbing restraint includes a first and second anchoring members adapted to connect the restraint to a device, such as a piping system subject to dynamic loads, to a structure. The first anchoring member has the internal entrapment members operably connected thereto. The second anchoring member has the external entrapment members operably connected thereto to isolate the device from the supporting structure.

25 Claims, 4 Drawing Sheets

U.S. PATENT DOCUMENTS

| | | | |
|---|---|---|---|
| 4,835,856 | 6/1989 | Azami | 29/156.6 |
| 4,854,556 | 8/1989 | Pietrzak | 267/33 |
| 4,955,467 | 9/1990 | Kallenbach | 188/381 |
| 5,037,060 | 8/1991 | Yalvac | 248/618 |
| 5,062,507 | 11/1991 | Roche | 188/378 |
| 5,149,066 | 9/1992 | Snaith et al. | 267/136 |
| 5,160,121 | 11/1992 | Bartholomew | 267/136 |
| 5,169,110 | 12/1992 | Snaith et al. | 248/570 |
| 5,240,232 | 8/1993 | Loziuk | 267/136 |
| 5,277,394 | 1/1994 | Slemmer | 248/570 |
| 5,360,210 | 11/1994 | Loziuk | 267/136 |
| 5,549,285 | 8/1996 | Collins | 267/148 |

OTHER PUBLICATIONS

Article "A Wire Rope Seismic Suport" by L. A. Loziuk, presented at the 1986 Symposium on Current Issues Related to Nuclear Power Plant Structures, Equipment and Piping Dec. 10–12, 1986.

American Steel and Wire New Product Development Report A204–X Cable Shock and Vibration Isolations, 3 pp., dated Mar. 10, 1964.

COMPACT PROFILE WIRE CABLE ISOLATOR AND ENERGY ABSORBING RESTRAINT

CROSS REFERENCE TO RELATED APPLICATIONS

This application is a continuation-in-part of U.S. patent application Ser. No. 08/475,519, filed Jun. 7, 1995 now U.S. Pat. No. 5,522,585, which is a continuation in part of U.S. patent application Ser. No. 08/274,645, filed Jul. 13, 1994, now U.S. Pat. No. 5,441,243, which is a continuation-in-part of U.S. patent application Ser. No. 07/978,018, filed Nov. 18, 1992, now U.S. Pat. No. 5,360,210 which is a continuation-in-part of U.S. patent application Ser. No. 07/915,477, filed Jul. 16, 1992, now U.S. Pat. No. 5,240,232.

FIELD OF THE INVENTION

This invention relates to energy absorbing restraining devices which restrain static and dynamic movement in a spring like manner and dampen dynamic movement. More particularly, the invention relates to a coiled wire rope cable isolator having a relatively compact radial profile for use in energy absorbing restraining devices for restraining static and dynamic motion.

BACKGROUND OF THE INVENTION

Energy absorbing restraints can be used in many applications. For example, such devices are used as restraints for process piping to dampen the motion of such piping caused by dynamic events such as fluid transients, flow induced steady state vibration, earthquakes and the like.

Additionally, for thermal considerations, piping systems must be supported to allow for expansion of the piping system due to the thermal growth which may be induced by a hot process fluid flowing therethrough. Design conflicts occur however, where piping system restraints are necessary to limit dynamic displacements at locations along a piping system which also encounters thermal growth.

Traditionally this conflict has been resolved by using snubbers which allow the pipe to freely expand but momentarily restrain the pipe during a dynamic event. Snubbers, however, absorb little energy, must be periodically serviced and have been known to fail, resulting in costly inspection programs, particularly in the nuclear electric power industry.

Various alternative restraint devices have been proposed. Such known devices include gapped restraints and energy absorbers. Gapped restraints allow free thermal travel of the piping system, but limit dynamic travel to the limits of preset travel constraints. One disadvantage of gapped restraints is that they impart high impact loads to the adjoining structure when such a restraint reaches the ends of its travel during a dynamic event.

Several types of energy absorbing restraints are available. One known energy absorbing restraint is disclosed in U.S. Pat. No. 4,620,688, to Khlafallah et al., entitled "Energy Absorbing Apparatus For Piping Systems And The Like," which utilizes steel flex plates which act as a spring. The spring action allows for thermal expansion and absorbs energy by plastic deformation of the plates during dynamic movement. One significant drawback to such a restraint, however, is that it has a low cycle fatigue life.

Another type of energy absorbing restraint is disclosed in U.S. Pat. No. 4,955,467, to Kallenbach, entitled "Energy Damping Device," in which energy is absorbed by friction which is generated by a reciprocating piston and cylinder arrangement. One drawback to this type of restraint is the large amount of variability in the resulting frictional force, which provides inconsistent forces during pipe thermal expansion and inconsistent energy absorption.

Still another type of energy absorbing restraint incorporates multi-strand helical cable trapped between plates such that it acts as a spring to allow for thermal expansion of the piping system. Devices using such an arrangement are disclosed, for example, in U.S. Pat. No. 4,190,227, to Belfield et al., entitled "Vibration Isolator And Method For Manufacturing Same," and U.S. Pat. No. 4,783,038, to Gilbert et al., entitled "Isolator Apparatus."

These devices absorb energy by the rubbing and sliding of cable strands when such strands are subject to dynamic displacements. The energy absorbing component of such devices is known as a wire rope isolator.

U.S. Pat. No. 5,240,232, to Loziuk, entitled "Pipe Restraint," discloses wire rope isolators incorporated into a pin-pin device for connection between, for example, process piping and a supporting structure. Another such device which utilizes wire rope isolators is disclosed in U.S. Pat. No. 5,277,394, to Arlo, entitled "Coaxial Isolator Device."

These devices use wire rope isolators which trap or clamp the wire cable bights, i.e., coils, at about 180° apart. Such devices, however, typically require centering bushings or slide plates to maintain the moving portions of the device coaxial, one relative to the other.

A device which eliminates the need for centering bushings or slide plates is disclosed in U.S. Pat. No. 5,441,243 to Loziuk, entitled "Wire Cable Isolator and Energy Absorbing Restraint." This device utilizes wire cable trapped at about 90° and does not require centering bushings or slide plates. This device, however, typically has a large wire rope isolator profile which may not be well suited to applications in which space requirements are limited.

Accordingly, there continues to be a need for a restraint device which uses wire rope isolators having a relatively compact profile, configured so as to eliminate the need for centering bushings or slide plates to maintain the moving portions of the device coaxial, relative to each other.

SUMMARY OF THE INVENTION

A compact profile, nested wire cable isolator is of simple construction, ease of inspection and minimal maintenance, and is used to connect and isolate a device subject to movement due to dynamic loads, from an adjacent structure. The isolator has predetermined, symmetrical force-deflection properties, and includes first and second discrete, axially oriented, nested wire cable spirals having at least one bight.

Each of the first and second spirals defines an open central region internal thereof. The isolator further includes first and second pairs of entrapment members each pair of members being associated with its respective wire cable spiral, and clamping its respective spiral at opposite ends thereof. The spirals have an externally unloaded shape maintained by its respective pair of entrapment members.

One of the first pair of entrapment members is an internal entrapment member and is positioned within the open central region of the second wire cable spiral. Likewise, one of the second pair of entrapment members is an internal entrapment member and is positioned within the central region of the first wire cable spiral. The internal entrapment members are operably connected one to the other. The other of the first and second pairs of entrapment members are external entrapment members.

In a preferred embodiment, the internal entrapment members are mounted to a central member. Most preferably, the first and second wire cable spirals include first and second portions, and the first and second portions are longitudinally displaced one from the other and are wound in opposing directions one relative to the other.

The isolator is used in an energy absorbing and displacement limiting device for connecting an object subject to movement due to dynamic loads, and an adjacent structure. The device has symmetrical stiffness properties in both tension and compression which resists buckling under load. The restraint device includes first and second anchoring members, each being adapted to connect to one of the object subject to dynamic movement and the adjacent structure for isolating the object from the structure.

A compact profile wire cable isolator is mounted to the restraint such that the internal entrapment members are operably connected to the first anchoring member, and the external entrapment members are operably connected to the second anchoring member. The anchoring members may take the form of hollow cylindrical members, channels and the like. In a preferred embodiment, the restraint includes an extension member to permit in-place adjustment of the length of the restraint and the load thereon.

Other features and advantages of the present invention will be apparent from the following detailed description, the accompanying drawings, and the appended claims.

DETAILED DESCRIPTION OF THE PREFERRED EMBODIMENTS

Figure 1:
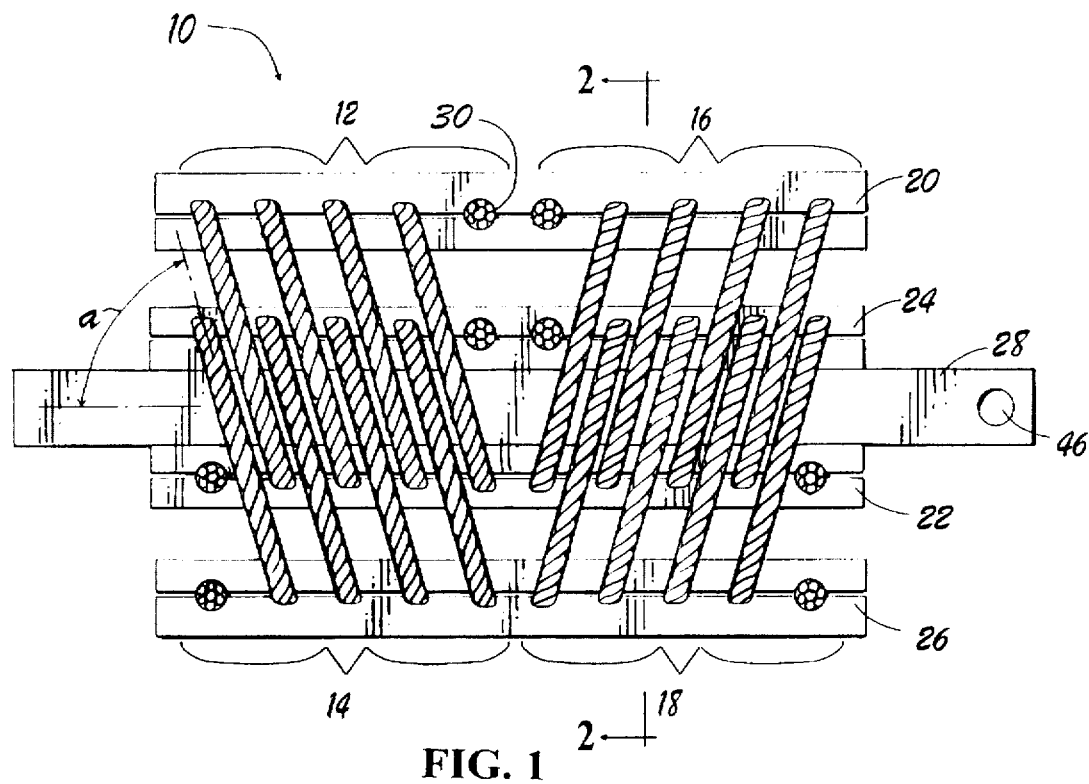
FIG. 1 is a side elevation view of a compact profile, nested wire cable isolator embodying the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
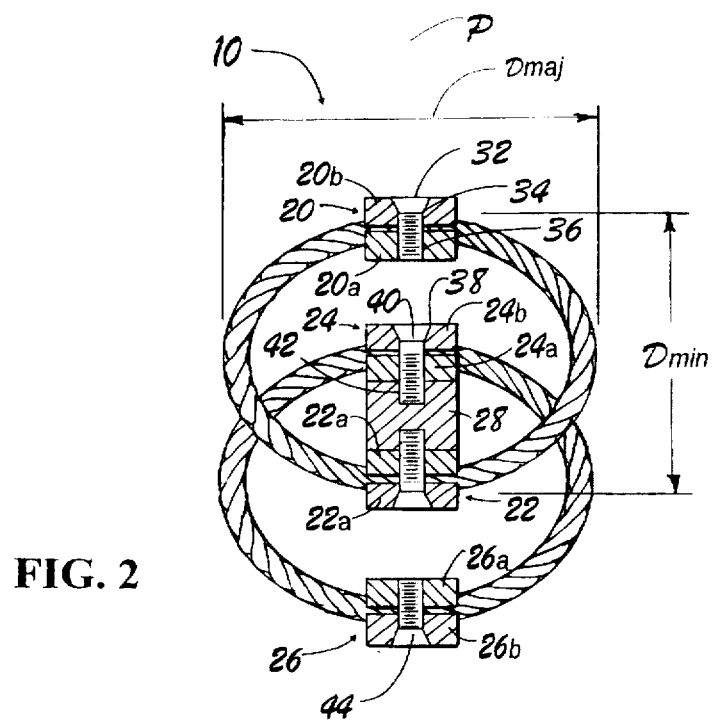
FIG. 2 is a cross sectional view of the wire cable isolator of FIG. 1, taken along line 2—2 thereof.

With reference now to the figures, and particularly to FIGS. 1 and 2, there is shown a wire cable isolator 10 of the present invention. The isolator includes wire cables 12, 14, which are formed in spirals and wire cables 16, 18, which are similarly formed in spirals. Preferably, the spirals of wire cable 12, 14 are disposed in an opposite winding direction to the spirals of wire cable 16, 18. The spirals of wire cable 12, 14, 16, 18, have a generally circular or near circular shape when viewed from a cross-section of the isolator 10, as best seen in, for example, FIG. 2. It is to be understood, however, that the wire cables 12, 14, 16, 18, can be formed in a variety of alternate shapes, such as an ellipse or the like, such alternate shapes being within the scope of the present invention.

Preferably, the wire cables 12, 14, 16, 18 are formed of individual strands of wire, which are twisted to form the wire cables 12, 14, 16, 18. The wire cables 12, 14, 16, 18, have a predetermined gauge or diameter.

Wire cable is typically formed of single wires which are wound or twisted together to form a cable strand. A group of cable strands are wound or twisted together to form a wire cable. Reference herein to the wire cable count is to the total number of single wires in the wire cable. Reference to the wire strand wind is the number of wires in each cable strand and the number of cable strands forming the cable.

For example, a wire cable that has a wire strand wind of 7×7 is formed of 7 cable strands, each strand being formed of 7 wires. The count, or total number of wires forming the cable, of such a 7×7 wire cable is 49.

As illustrated in FIGS. 1 and 2, the isolator 10 includes a first pair of entrapment members 20, 22 and a second pair of entrapment members 24, 26. Each entrapment member 20, 22, 24, 26, includes a respective inner clamping plate 20a, 22a, 24a, 26a, and a respective outer clamping plate 20b, 22b, 24b, and 26b.

The first pair of entrapment members 20, 22, clamp or capture the wire cables 12, 16 at opposite sides of the spirals and the second pair or entrapment members 24, 26 clamp or capture the wire cable spirals 14, 18 at opposite sides of the spirals. Preferably, entrapment members 20, 22 clamp the spirals of wire cable 12, 16 at 180° one with the other, and entrapment members 24, 26, clamp the spirals of wire cable 14, 18, at 180° one with the other.

The first pair of entrapment members 20, 22 and the second pair of entrapment members 24, 26 are disposed at predetermined positions relative to each other. Preferably, the first pair of entrapment members 20, 22, and the second pair of entrapment members 24, 26, are disposed in a single plane P, as illustrated in FIG. 2.

The assembly of wire cable 12, 16 and entrapment members 20, 22, are disposed at a predetermined position relative to the assembly of wire cable 14, 18 and entrapment members 24, 26. In a preferred embodiment, the spiral 12 is longitudinally displaced and separated from the spiral 16. Likewise, the spiral 14 is longitudinally displaced and separated from the spiral 18. Spirals 12 and 14 however are nested, one with the other, as are spirals 16 and 18. In a most referred embodiment, the two assemblies are mounted to a central member 28 with suitable fasteners. It is understood that central member 28 and inner clamping plates 22a, 24a, may be integrated into a unitary assembly.

Referring to FIG. 2, entrapment member 24 is positioned within an internal region of its opposing spirals 12 and 16. Likewise, entrapment member 22 is positioned within an internal region of its opposing spirals 14 and 18. These entrapment members 22, 24 are thus internal entrapment members. Entrapment members 20 and 26 are positioned external to their respective opposing spirals 14, 18 and 12, 16, respectively, and are thus external entrapment members.

As best seen in FIG. 1, with reference to the first pair of entrapment members 20, 22 and the second pair of entrapment members 24, 26, each of the clamping plates 20a,b, 22a,b, 24a,b, 26a,b, has a plurality of semicircular notches 30 formed laterally therein for receipt of the wire cables 12, 14, 16, 18. The notches 30 of each of the inner clamping plates 20a–26a, are aligned with the associated notches 30 of its respective outer clamping plate 20b–26b. This arrangement forms a generally circular bore through the plates 20a,b–26a,b, for receiving and securing, or capturing, the wire cable 12, 14, 16, 18 therebetween.

The inner plates 20a–26a, and outer plates 20b–26b are secured together with suitable fasteners, such as with threaded bolts 32. The bolts 32 extend through bores 34 in their respective outer plates 20b–26b, and engage respective threaded bores 36 in the respective inner plates 20a–26a. Mounting bores 38 are provided at locations along the entrapment members 22, 24. Threaded bolts 40 extend through the mounting bores 38 and engage the threaded bores 42 located in the central member 28.

A mounting bore 46 in the central member 28 facilitates mounting the isolator 10 to a structure, housing or device. Additional mounting bores 44 are also provided along entrapment members 20, 26 for mounting to a structure, housing or device as will be further discussed herein.

The isolator 10 exhibits certain force-deflection properties or "stiffness". That is, as forces are placed on the isolator 10 in the various directions, e.g., in the transverse and axial directions, the wire cables 12–18 deflect and exhibit their own responsive forces.

The force-deflection properties of the isolator 10 may be a function of the specific configuration of the isolator 10 and the type and size of the wire cables 12–18 used. Some of the design considerations for the cables 12–18 include the material, size and thickness of the wire cables 12–18, as well as the wire strand wind. Design considerations for the isolator 10 include the pitch of the loops, i.e., the angle $\alpha$ of the cable relative to the longitudinal axis of the isolator 10 of the spirals of cable, the loop diameter, and the number of loops or bights in the isolator 10.

In addition, the force-deflection properties of the isolator 10 may also be a function of the major and minor diameters $D_{maj}$, $D_{min}$, of an elliptical spiral, if such a spiral is used, as shown in FIG. 2.

As will be recognized by those skilled in the art, given the combinations possible in the design of the isolator 10 and the cables 12–18, the isolator 10 can be used in a wide range of situations and applications where dynamic loads must be accommodated for a particular system design. Such applications may include piping systems and mounting/isolation systems for devices such as electronic devices and rotating equipment.

Figure 3:
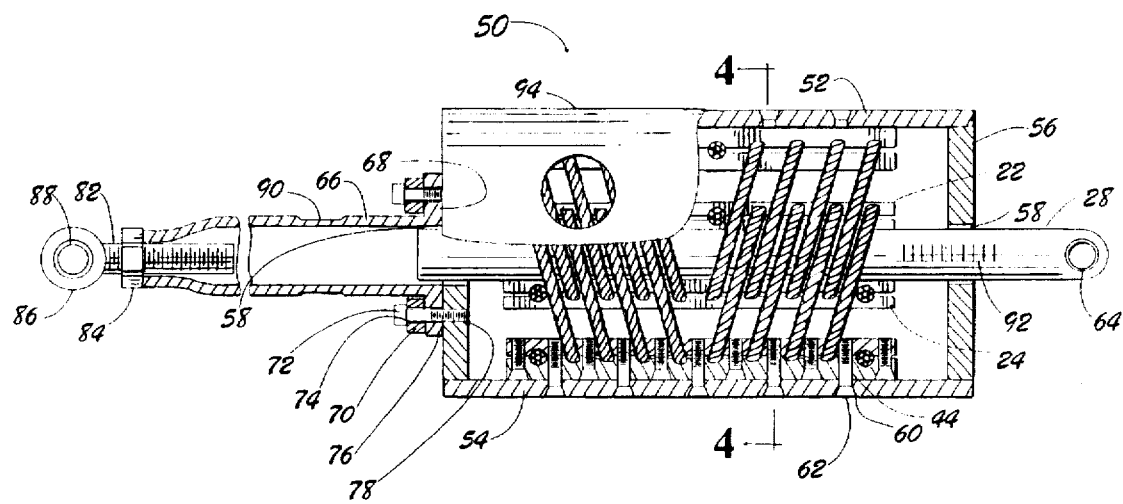
FIG. 3 is a side elevational view of an embodiment of a restraint device, with a portion of the outer wall broken-away for clarity of illustration, illustrating an isolator of the present invention assembled within the annulus of a cylinder-type restraint.
Figure 4:
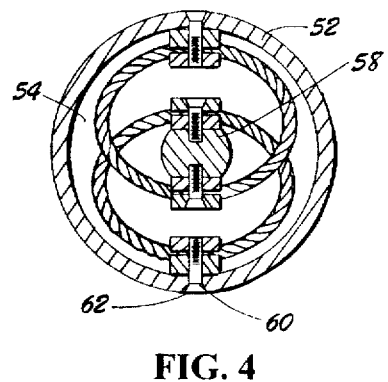
FIG. 4 is a cross-sectional view of the restraint device of FIG. 3, taken along line 4—4 thereof.

One device in which the isolator 10 of the present invention is used is a cylinder mounted pin-pin type of restraint 50 as shown in FIGS. 3 and 4. The cylinder mounted restraint 50 includes an outer, hollow cylinder 52, and an isolator 10 which is disposed internally of the cylinder 52.

The outer, hollow cylinder 52 includes a pair of end caps 54, 56 at either end of the cylinder 52. The end caps 54, 56 have bores 58, generally centrally therethrough. The end caps 54, 56 may be sealed to the outer cylinder 52 in a suitable manner, such as by welding, threaded connections, fasteners, or the like.

The outer cylinder 52 also includes mounting holes 60 positioned along its length at locations which align with the mounting bores 44 of the isolator 10.

The central member 28 of the isolator 10 is coaxial with and extends through the bores 58 located in end caps 54, 56. The central member 28 may be provided with a spherical bearing 64 at one end for securing the restraint to a structure, pipe or the like.

In order to prevent the wire bights of the isolator 10 from excessive displacement, the end caps 54, 56 provide internal stops to the restraint 50 by limiting the travel of entrapment members 22, 24, to the extent that the entrapment members 22, 24 strike the caps 54, 56, when deflected in a longitudinal direction.

A rotatable extension member, such as the illustrated extension tube 66 with a base flange 68 is disposed central to the bore 58 and may be configured to receive the central member 28. A retaining ring 70 captures the base flange 68 of the extension tube 66. Suitable fasteners 72 extend through bores 74 located in retaining ring 70 and are received and engaged by threaded bores 78 located in the end cap 54. A spacer ring 76 may be utilized to minimize excessive deformation of the retaining ring 70 when the fasteners 72 are tightened.

The extension tube 66 includes a threaded bore 80 at the end opposite the flange 68, which engages a threaded rod 82. The rod 82 may include an enclosed end 86 and a jam nut 84 to prevent the rod 82 from disengaging from the threaded bore 80. The enclosed end may be adapted to receive a spherical bearing 88 for mounting the restraint 50 to a structure, pipe or the like.

By loosening fasteners 72, the length of the restraint 50 may be adjusted a turnbuckle fashion by rotating extension tube 66. Flats 90 may be provided on extension tube 66 to facilitate the use of an appropriate tool when rotating the extension tube 66.

In assembling the restraint 50, an appropriate isolator 10 is placed into the outer cylinder 52, with central member 28 extending through bores 58 located in end caps 54, 56. The isolator 10 is mounted to the outer cylinder 52 by entrapment members 20, 26, which are at predetermined positions about an exterior periphery of the spirals. Preferably, the first pair of entrapment members 20, 22 and the second pair of entrapment members 24, 26 are coplanar. The isolator 10 is mounted to the outer cylinder using suitable fasteners such as bolts 62.

The threaded rod 82 and, as necessary, the jam nut 84, extension tube 66, mounting flange 72 and, as needed, the spacing ring 76 are assembled to the restraint. The approximate overall length of the restraint 50 required for a particular application is established and is accommodated for by using differing lengths of extension tubes 66. The length of the restraint 50 can be adjusted prior to installation to meet the requirements of the particular installation by adjusting the engagement of the threaded rod 82 external of the restraint 50. Once installed, the restraint length and load can be adjusted by loosening fasteners 72 and rotating the extension tube 66 about the longitudinal axis of the restraint 50 to threadedly engage the rod 82 in a turnbuckle-like manner. After the proper length and load are achieved, the fasteners 72 are tightened.

Markings 92 may be provided on the central member 28 to indicate the displacement of and/or the load on the restraint 50. The outer cylinder 52 may also include inspection ports 94 along its length for visually inspecting the isolator 10.

Figure 5:
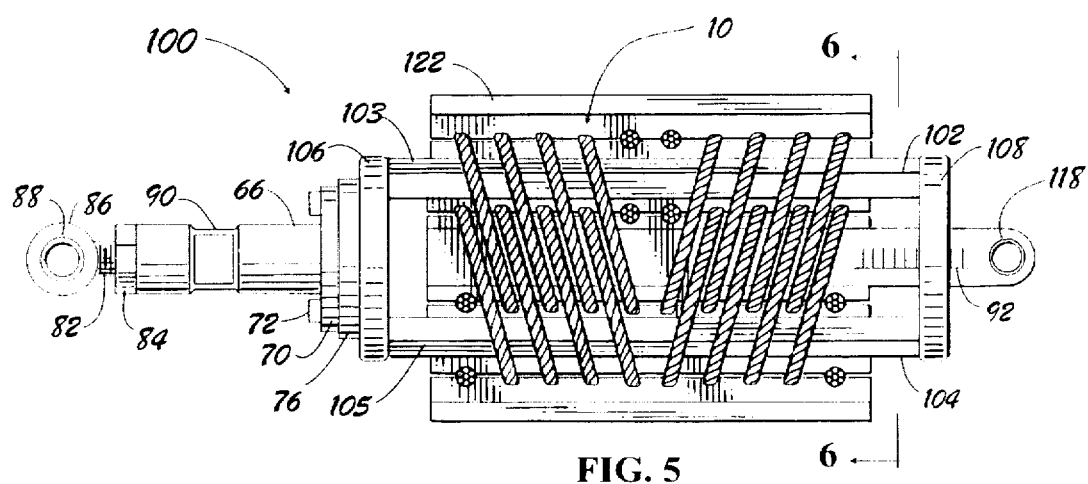
FIG. 5 is a side elevational view of an alternate embodiment of a restraint device illustrating an isolator of the present invention assembled within an externally viewable, channel-type restraint.
Figure 6:
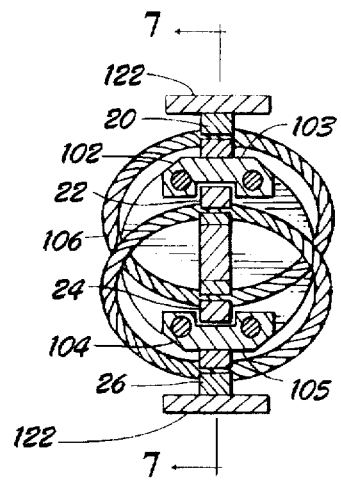
FIG. 6 is a cross-sectional view of the restraint device of FIG. 5, taken along line 6—6 thereof.
Figure 7:
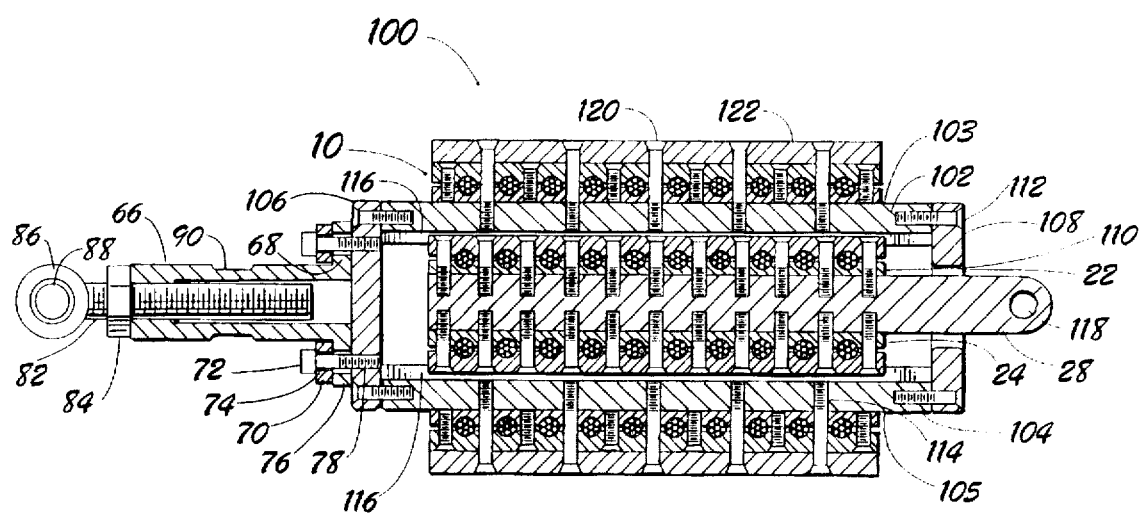
FIG. 7 is a cross-sectional view of the restraint device of FIG. 5, taken along line 7—7 of FIG. 6.

FIGS. 5–7 illustrate an alternate embodiment 100 of a pin—pin type restraint, i.e., an externally viewable channel-type restraint, which uses the isolator 10 of the present invention. The channel type restraint 100 includes an isolator 10 which is disposed at least in part, externally of a pair of channel members 102, 104. This arrangement facilitates viewing the wire cables 12, 14, 16, 18 which provides for ease of inspection of the isolator 10.

A pair of end caps 106, 108 are connected at each end of the channel members 102, 104. The end cap 108 has a bore 110, generally centrally therethrough. The end caps 106, 108 may be mounted to the channel members 102, 104 in a suitable manner such as by the exemplary fasteners 112. The end caps may also be mounted to the channel members 102, 104 by welding, and the like.

Each of the channel members 102, 104 also includes mounting holes 114 positioned along its length at locations which align with the mounting bores 44 of the isolator 10.

The movement of the central member 28 of the isolator 10 is limited in the directions transverse to the longitudinal axis L of the restraint 100 by channels 116 located in channel members 102, 104. The amount of allowed transverse movement is determined by the size of the channels 116 and the mounting locations of the channel members 102, 104 to the end caps 106, 108. In order to prevent the wire bights of the isolator 10 from excessive displacement, the end caps 106, 108 provide internal stops along the longitudinal axis of the restraint 100 by limiting the travel of entrapment members 22, 24, to the extent that the entrapment members 22, 24 strike the caps 106, 108 when deflected in a longitudinal direction.

One end of central member 28 of the isolator 10 is generally coaxial with and extends into the bore 110 located in end cap 108. Central member 28 may be provided with a spherical bearing 118 at one end for securing the restraint to a structure, pipe or the like.

In a similar fashion to the cylinder type restraint 50, a rotatable extension member, such as the illustrated extension tube 66 with a base flange 68 is disposed central to end cap 106. A retaining ring 70 captures the base flange 68 of the extension tube 66. Suitable fasteners 72 extend through bores 74 located in retaining ring 70 and are received by threaded bores 78 located in the end cap 106. A spacer ring 76 may be utilized to minimize excessive deformation of the retaining ring 70 when the fasteners 72 are tightened.

The extension tube 66 includes a threaded bore 80 at the end opposite the flange 68, which engages a threaded rod 82. The rod 82 may include an enclosed end 86 and a jam nut 84 to prevent the rod 82 from disengaging from the threaded bore 80. The enclosed end may be adapted to receive a spherical bearing 88 for mounting the restraint 50 to a structure, pipe or the like.

By loosening fasteners 72, the length of the restraint 100, and the load thereon, may be adjusted in a turnbuckle-like fashion by rotating extension tube 66. Flats 90 may be provided on extension tube 66 to facilitate the use of an appropriate tool when rotating extension tube 66.

In assembling the restraint 100, channel members 102, 104 are disposed within the central regions of the spirals of an appropriate isolator 10, with central member 28 extending through bore 110 located in end cap 108. That is, the external entrapment members 20, 26 are mounted to external surfaces 103, 105 of their respective channel members 102, 104. The isolator 10 is mounted to the channel members 102, 104 by external entrapment members 20, 26, which are at a predetermined position about an exterior periphery of the spirals. Preferably, the first pair of entrapment members 20, 22 and the second pair of entrapment members 24, 26 are coplanar. The isolator 10 is mounted to the channel members 102, 104 using suitable fasteners such as bolts 120.

Stiffening plates 122 may be incorporated into the restraint 100 in order to develop a stronger composite section comprising of a channel member 102 (104), entrapment members 20, (22) and stiffening plate 122. Such a stronger composite section may be required for larger restraint 100 sizes to resist buckling when the restraint 100 is loaded in compression and to minimize bending stresses in the channel members 102, 104 induced when the restraint 100 is loaded and the wire bights are prevented from inward movement by the channel members 102, 104.

The threaded rod 82 and, as necessary, the jam nut 84, extension tube 66, mounting flange 72 and, as necessary, the spacing ring 76 are assembled to the restraint. The approximate overall length of the restraint 100 required for a particular application is establish, and is accommodated for by using differing lengths of extension tubes 66. The length of the restraint 100 can be adjusted prior to installation to meet the requirements of the particular installation by adjusting the engagement of the threaded rod 82 external of the restraint 50. Once installed, the restraint 100 length and the load thereon can be adjusted by loosening fasteners 72 and rotating the extension tube 66 about the longitudinal axis of the restraint 50 to threadedly engage the rod 82 in a turnbuckle-like manner. After the proper length and load are achieved, the fasteners 72 are tightened.

Markings 92 may be provided on the central member 28 to indicate the displacement and/or the load on the restraint 100.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A compact profile, nested wire cable isolator of simple construction, ease of inspection and minimal maintenance to connect to, and isolate a device subject to movement due to dynamic loads, from an adjacent structure, the wire cable isolator having predetermined, symmetrical force-deflectionproperties, the wire cable isolator comprising:

first and second discrete, axially oriented, separately formed nested wire cable spirals, having at least one bight, each of said first and second spirals defining an open central region having an axis generally longitudinally therethrough; and a first pair of entrapment members associated with said first wire cable spiral and a second pair of entrapment members associated with said second wire cable spiral, said pairs of entrapment members clamping their respective wire cable spirals in opposing, spaced relation to one another relative to said axes, each of said first and second wire cable spirals having an externally unloaded shape maintained by its respective pair of entrapment members, wherein one of said first pair of entrapment members is an internal entrapment member being positioned within said open central region of said second wire cable spiral and wherein one of said second pair of entrapment members is an internal entrapment member positioned within said central region of said first wire cable spiral, said internal entrapment members being operably connected one to the other, the others of said first and second pair of entrapment members being external entrapment members.

2. The compact profile isolator of claim 1 including a central member, said internal entrapment members being mounted to said central member.

3. The compact profile isolator of claim 1 wherein at least one of said first and second wire cable spirals include first and second portions, said first and second portions being longitudinally displaced one from the other.

4. The compact profile isolator of claim 1 wherein said entrapment members associated with each said spiral are positioned 180° one relative to the other.

5. The compact profile isolator of claim 1 wherein at least one of said entrapment members includes an inner clamping plate and an outer clamping plate being secured one to the other with the wire cable spiral captured therebetween.

6. The compact profile isolator of claim 1 wherein said wire cable spiral has a predetermined diameter, a predetermined count and a predetermined wire strand wind, and wherein said force-deflection properties of said isolator are determined by at least one of said predetermined diameter, said predetermined count and said predetermined wire strand wind.

7. The compact profile isolator of claim 1 wherein said wire cable spiral has a predetermined pitch angle, and wherein said force-deflection properties of said isolator are determined by said predetermined pitch angle.

8. The compact profile isolator of claim 1 wherein said wire cable spiral includes a predetermined number of bights, and wherein said force-deflection properties of said isolator are determined by said predetermined number of bights.

9. The compact profile isolator of claim 1 wherein said wire cable spiral has predetermined major and minor diameters and wherein said force-deflection properties of said isolator are determined by said predetermined major and minor diameters.

10. An energy absorbing and displacement limiting device of simple construction, ease of inspection and minimal maintenance, said device for connecting an object subject to movement due to dynamic loads, and an adjacent structure, the device having symmetrical stiffness properties in both tension and compression which resists buckling under load, the device comprising:

first and second anchoring members, each of said anchoring members being adapted to connect to one of the object subject to dynamic movement and the adjacent structure for isolating the object from the structure;

a compact profile wire cable isolator having first and second discrete, axially oriented, nested wire cable spirals having at least one bight, each of said first and second spirals defining an open central region having an axis generally longitudinally therethrough; and a first pair of entrapment members associated with said first wire cable spiral and a second pair of entrapment members associated with said second wire cable spiral, said pairs of entrapment members clamping their respective wire cable spirals in opposing, spaced relation to one another relative to said axes, each of said first and second wire cable spirals having an externally unloaded shape maintained by its respective pair of entrapment members, wherein one of said first pair of entrapment members is an internal entrapment member being positioned within said open central region of said second wire cable spiral and wherein one of said second pair of entrapment members is an internal entrapment member being positioned within said central region of said first wire cable spiral, said internal entrapment members being operably connected to said first anchoring member, and wherein the others of said first and second pairs of entrapment members being external entrapment members being operably connected to said second anchoring member.

11. The energy absorbing and displacement limiting device of claim 10 wherein one of said first and second anchoring members includes a hollow cylindrical member defining an open internal region having said isolator mounted at least in part therein, and wherein said external entrapment members are mounted to said internal region of said hollow cylindrical member.

12. The energy absorbing and displacement limiting device of claim 10 including markings on said first anchoring member thereby indicating one of a displacement and a load setting on said device.

13. The energy absorbing and displacement limiting device of claim 11 wherein said hollow cylindrical member includes viewing ports therein.

14. The energy absorbing and displacement limiting device of claim 11 wherein said internal entrapment members are operably connected to one another at a central member, and wherein said hollow cylindrical member includes end caps mounted thereto adapted to receive said central member, said end caps limiting transverse and axial movement of said central member relative to said hollow cylindrical member.

15. The energy absorbing and displacement limiting device of claim 11 wherein one of said end caps is adapted to receive an extension member mountable to said end cap, said extension member having a threaded connection thereon adapted to receive a threaded rod for adjustably, longitudinally positioning said hollow cylindrical member to adjust said device to connect the object subject to movement due to dynamic loads to the adjacent structure.

16. The energy absorbing and displacement limiting device of claim 15 wherein said extension member is rotatable relative to said hollow cylindrical member to provide in-place adjustment of said device between the object subject to movement due to dynamic loads to the adjacent structure.

17. The energy absorbing and displacement limiting device of claim 10 including first and second channel members defining said second anchoring member.

18. The energy absorbing and displacement limiting device of claim 17 wherein said internal entrapment members are connected to one another at a central member, and wherein said channel members include end caps mounted thereto, one of said end caps defining a bore therein adapted to receive said central member, said bore being adapted to receive said first anchoring member therethrough, said other of said end caps being adapted to receive an extension member therein adapted for rotationally adjusting said device to connect subject to movement due to dynamic loads to the adjacent structure.

19. The energy absorbing and displacement limiting device of claim 17 further including stiffener plates mounted to said entrapment members.

20. The energy absorbing and displacement limiting device of claim 17 wherein said external entrapment members are mounted to an external surface of each of said channel members.

21. The energy absorbing and displacement limiting device of claim 18 wherein said extension member is rotatable relative to said hollow cylindrical member to provide in-place adjustment of said device between the object subject to movement due to dynamic loads to the adjacent structure.

22. The energy absorbing and displacement limiting device of claim 17 wherein at least one of said first and second channel members defines a channel therein adapted to receive a respective one of said internal entrapment members to limit transverse movement of said internal entrapment member.

23. The energy absorbing and displacement limiting device of claim 22 wherein each of said first and second channel members defines a channel therein adapted to receive a respective internal entrapment member to limit transverse movement of said internal entrapment member.

24. The energy absorbing and displacement limiting device of claim 16 wherein said extension member includes flat portions thereon.

25. The energy absorbing and displacement limiting device of claim 21 wherein said extension member includes flat portions thereon.

* * * * *